(12) United States Patent
Zwick

(10) Patent No.: US 8,697,801 B2
(45) Date of Patent: Apr. 15, 2014

(54) PALLET WITH FIRE RETARDANT AND METHOD OF MANUFACTURE

(71) Applicant: Primex Plastics Corporation, Richmond, IN (US)

(72) Inventor: Paul D. Zwick, Chattanooga, TN (US)

(73) Assignee: Primex Plastics Corporation, Richmond, IN (US)

( * ) Notice: Subject to any disclaimer, the term of this patent is extended or adjusted under 35 U.S.C. 154(b) by 0 days.

(21) Appl. No.: 13/909,661

(22) Filed: Jun. 4, 2013

(65) Prior Publication Data

US 2013/0274387 A1 Oct. 17, 2013

Related U.S. Application Data

(63) Continuation of application No. PCT/US2012/020189, filed on Jan. 4, 2012.

(60) Provisional application No. 61/429,553, filed on Jan. 4, 2011.

(51) Int. Cl.
  *C08F 2/44* (2006.01)
  *C08F 214/06* (2006.01)
  *C08F 110/02* (2006.01)

(52) U.S. Cl.
  USPC ............................ 524/849; 524/851; 526/352

(58) Field of Classification Search
  USPC ................................... 524/849, 851; 526/352
  See application file for complete search history.

(56) References Cited

U.S. PATENT DOCUMENTS

| | | | |
|---|---|---|---|
| 3,839,239 A | 10/1974 | Godfried | |
| 3,893,970 A | 7/1975 | Versnel | |
| 4,099,975 A | 7/1978 | Albright | |
| 4,129,535 A | 12/1978 | Elcik | |
| 4,727,102 A | 2/1988 | Scarso | |
| 4,776,981 A | 10/1988 | Kress et al. | |
| 5,011,880 A | 4/1991 | Cornibert et al. | |
| 5,078,918 A | 1/1992 | Fishler et al. | |
| 5,143,778 A * | 9/1992 | Shuert | 428/213 |
| 5,776,281 A * | 7/1998 | Evans | 156/244.17 |
| 6,083,428 A | 7/2000 | Ueda et al. | |
| 6,239,197 B1 | 5/2001 | Haywood et al. | |
| 6,284,343 B1 | 9/2001 | Maples et al. | |

(Continued)

OTHER PUBLICATIONS

International Search Report and the Written Opinion for PCT/US2012/020189 dated Aug 31, 2012 (10 pages).

(Continued)

*Primary Examiner* — William Cheung
(74) *Attorney, Agent, or Firm* — Bose McKinney & Evans LLP

(57) ABSTRACT

A plastic pallet having a fire retardant. The fire retardant is prepared in an FR masterbatch before mixing with HDPE to form the pallet. In one embodiment, the FR masterbatch includes a brominated fire retardant, a hydrated mineral, antimony trioxide and a carrier resin. In some embodiments, the brominated fire retardant is a non-blooming brominated fire retardant such as poly pentabromobenzyl acrylate or ethylenebistetrabromophthalamide. The hydrated mineral advantageously enhances both the vapor phase and condensed phase fire retardant properties of the final product and may be magnesium hydroxide. In other embodiments, melamine pyrophosphate or a blend of melamine pyrophosphate and polyhydric compound may be substituted for the hydrated mineral or used as the sole fire retardant. The polyhydric compound may be bis-pentaerythritol phosphate alcohol. A method of manufacturing a plastic pallet is also disclosed.

40 Claims, 1 Drawing Sheet

(56) References Cited

U.S. PATENT DOCUMENTS

| | | |
|---|---|---|
| 6,294,114 B1 | 9/2001 | Muirhead |
| 6,718,888 B2 | 4/2004 | Muirhead |
| 6,749,418 B2 | 6/2004 | Muirhead |
| 6,849,677 B2 | 2/2005 | Overholt |
| 6,943,678 B2 | 9/2005 | Muirhead |
| 7,018,571 B1 | 3/2006 | Camarota et al. |
| 7,342,496 B2 | 3/2008 | Muirhead |
| 7,378,463 B2 | 5/2008 | Abu-Isa |
| 7,735,430 B2 | 6/2010 | Muirhead |
| 7,752,980 B2 | 7/2010 | Muirhead |
| 7,789,024 B2 | 9/2010 | Muirhead |
| 7,804,400 B2 | 9/2010 | Muirhead |
| 7,874,256 B2 | 1/2011 | Muirhead |
| 7,897,070 B2 | 3/2011 | Knocke et al. |
| 7,932,338 B2 | 4/2011 | Bareket |
| 7,948,371 B2 | 5/2011 | Muirhead |
| 7,963,235 B2 | 6/2011 | Muirhead |
| 8,077,040 B2 | 12/2011 | Muirhead |
| 8,210,107 B2 | 7/2012 | Muirhead |
| 8,313,594 B2 | 11/2012 | Muirhead |
| 8,347,794 B2 | 1/2013 | Muirhead |
| 2002/0169240 A1 | 11/2002 | Bar-Yakov et al. |
| 2004/0036061 A1 | 2/2004 | Rhodes et al. |
| 2004/0097619 A1 | 5/2004 | Troutman et al. |
| 2004/0236132 A1 | 11/2004 | Lee et al. |
| 2005/0171254 A1 | 8/2005 | Abu-Isa |
| 2005/0285086 A1 | 12/2005 | Kosaka et al. |
| 2006/0270759 A1 | 11/2006 | Muirhead et al. |
| 2008/0073627 A1* | 3/2008 | Goode et al. .......... 252/607 |
| 2009/0292032 A1 | 11/2009 | Gupta et al. |
| 2009/0309077 A1 | 12/2009 | Gupta et al. |
| 2010/0152376 A1 | 6/2010 | Wermter |
| 2010/0251941 A1 | 10/2010 | Muirhead |
| 2011/0068924 A1 | 3/2011 | Muirhead |
| 2012/0309869 A1 | 12/2012 | Bar-Yaakov et al. |

OTHER PUBLICATIONS

Scott Muirhead, Oct. 21, 2013 Letter, Re: Investigation into Zwick U.S. Appl. No. 13/909,661, 3 pages.

* cited by examiner

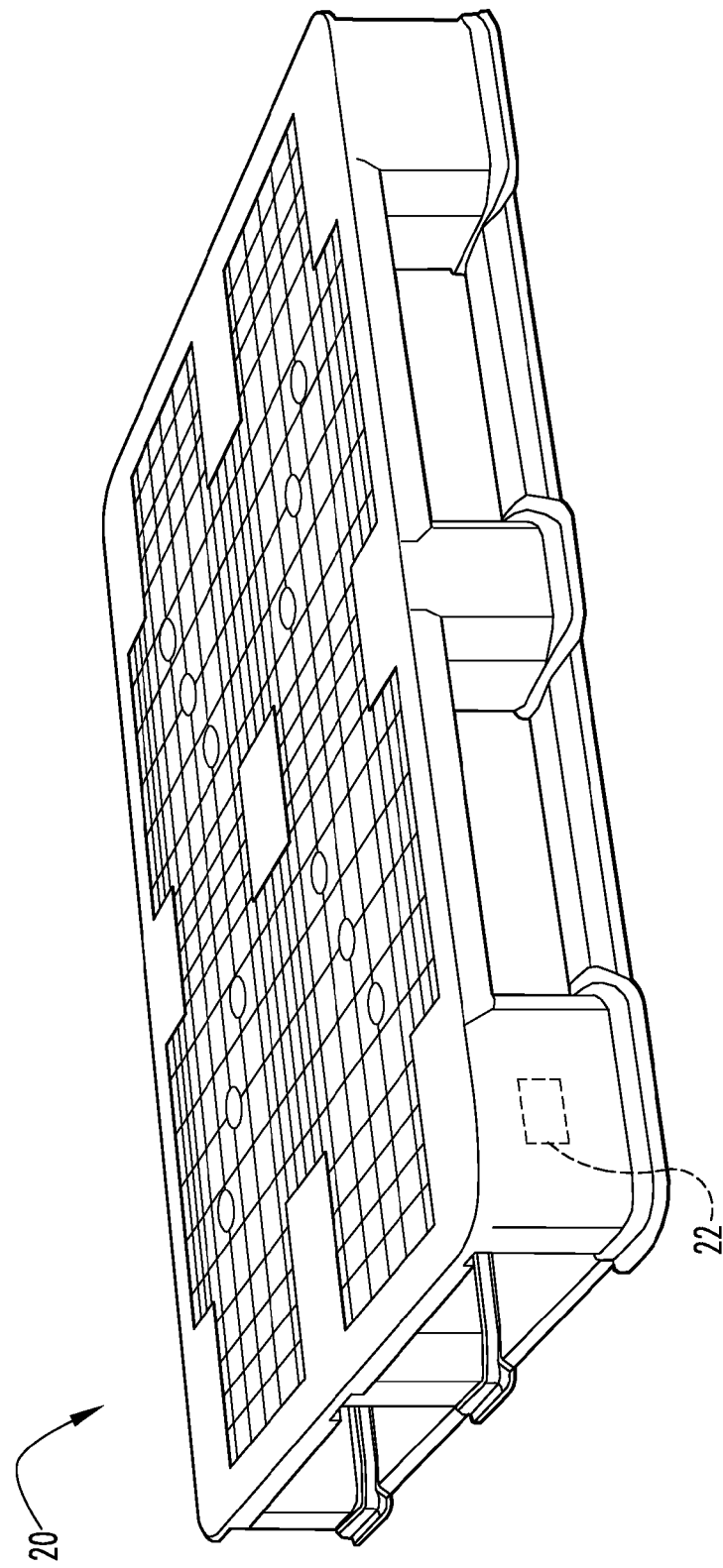

PALLET WITH FIRE RETARDANT AND METHOD OF MANUFACTURE

CROSS REFERENCE TO RELATED APPLICATIONS

This application is a continuation application of International Application PCT/US2012/020189 filed Jan. 4, 2012 entitled FIRE RETARDANT AND METHOD OF USE, which claims priority to U.S. provisional patent application Ser. No. 61/429,553 filed on Jan. 4, 2011 entitled FIRE RETARDANT AND METHOD OF USE, both of which are hereby incorporated herein by reference.

BACKGROUND OF THE INVENTION

1. Field of the Invention

The present invention relates to plastic pallets and, more particularly, to plastic pallets having flame retardant properties.

2. Description of the Related Art

The use of plastic pallets is known and such pallets are generally required to meet the flame retardant standards such as UL 2335 and FM4996. These standards both involve large scale burn tests that are conducted by testing actual production parts. For example, such a test may include burning an array of 6 columns of 26 pallet stacks. Such tests involve measuring the time required for sprinkler set-off, the number and time of flame breaches out of the sides of the pallet stack, time for total pallet burn extinction, and heat generated during the pallet burn test. It is noted that the terms plastic pallet and polymeric pallet are used interchangeably herein.

Generally, the process for manufacturing plastic pallets includes forming a top deck from thermoformed extruded sheet material and forming the bottom deck from an injection molded section. It is common for both the top deck and bottom deck to utilize high density polyethylene ("HDPE") and a fire retardant ("FR") system along with a standard color concentrate added during the extrusion or molding process. For the extruded/thermoformed sheet component, the HDPE used is typically what is referred to as high molecular weight polyethylene which is by definition not only a high density polyethylene (0.95 density or above) but also a very high molecular weight/very high viscosity/very low melt flow HDPE. The typical melt flow for the extruded sheet component is in the range of 8-25 under High Load Melt Index ("HLMI") conditions (190 C/21.6 kg load when measured under the ASTM D1238 method). For the injection molded component the melt flow tends to range between 4 and 10 with 6 to 8 being preferred (the injection molded component is typically formed out of standard HDPE, not a high molecular weight polyethylene, and these melt flow ranges are measured under the standard polyethylene conditions of 190 C/2.16 kg load which corresponds to condition E in ASTM D1238 not HLMI conditions. The separately extruded/thermoformed sheet and injection molded component are commonly heat welded together to form the integral plastic pallet, and steel reinforcement beams are often added to increase rigidity and strength as needed.

Several FR are known in the art. Such known FR include brominated organic compounds, more particularly, polybrominated diphenyl oxides such as pentabromodiphenyl oxide ("PENTA"), octabromodiphenyl oxide ("OCTA") and decabromodiphenyl oxide ("DECA"). PENTA and OCTA are effective and were commonly used in the past but in recent years have been phased out of use by regulations. As the use of PENTA and OCTA was discontinued, DECA became more popular as it found increased usage as a replacement for PENTA and OCTA.

DECA quickly became one of the most widely used and cost-effective brominated FR used with plastic pallets. When used with polythylene pallets, it has been shown to generally pass the UL and FM standards when used at approximately 4 to 5% (by weight) in conjunction with 2 to 2.5% (by weight) antimony trioxide. The efficacy of DECA, however, can vary depending upon the amount of DECA used and type of polyethylene used.

The use of DECA is not without downsides. For example, it often migrates to the surface of the plastic parts in a process commonly referred to as "blooming." If the blooming is bad enough it can affect the ability of the two components (extruded/thermoformed sheet and molded component) to form a sufficiently strong weld. The UV stability of DECA is also known to be poor and can result in the loss of color, gloss and other physical properties of the plastic parts containing the DECA. It is also subject to plate out and deposition onto process equipment especially during a sheet extrusion process. While deposition on process equipment does not directly impact performance, it does cause additional equipment maintenance expenses.

Environmental concerns related to the bioaccumulation and environmental persistence of DECA has recently led to increased regulation by EPA and OSHA. As a result, DECA is in the process of being phased out over the next several years (with a gradual reduction of usage every year by 25% or more by region) until it is banned for usage by the end of 2013 (except for aerospace and certain military applications if no effective alternative is available).

A fire retardant alternative to DECA that minimizes or eliminates blooming while still allowing plastic pallets formed with HDPE blends to satisfy the UL 2335 and FM 4996 standards is desirable.

SUMMARY OF THE INVENTION

The present invention provides a fire retardant that can be employed in the manufacture of polyethylene pallets.

The invention comprises, in one form thereof, a method of manufacturing a polymeric pallet that includes mixing polyethylene with a fire retardant additive to form a final mixture wherein the fire retardant additive includes a brominated fire retardant, a hydrated mineral and antimony trioxide and using the final mixture to form at least a portion of the pallet.

In some embodiments, the method includes mixing the fire retardant additive with a carrier resin to form a masterbatch and mixing the masterbatch with the polyethylene to form the final mixture. The brominated fire retardant may be a non-blooming brominated fire retardant such as poly pentabromobenzyl acrylate and/or ethylenebistetrabromophthalamide.

The hydrated mineral advantageously enhances both the vapor phase fire retardant properties and the condensed phase fire retardant properties of the final product. In some embodiments, the hydrated mineral is magnesium hydroxide.

The invention comprises, in another form thereof, a method of manufacturing a polymeric pallet that includes mixing polyethylene with a fire retardant additive to form a final mixture wherein the fire retardant additive includes a brominated fire retardant, melamine pyrophosphate and antimony trioxide and using the final mixture to form at least a portion of the pallet.

In some embodiments, the method includes mixing the fire retardant with a carrier resin to form a masterbatch and mixing the masterbatch with the polyethylene to form the final mixture. In still other embodiments, the fire retardant additive further includes a polyhydric compound which may be bis-pentaerythritol phosphate alcohol, trishydroxyethylisocyanurate, dipentaerythritol and/or pentaerythritol.

The invention comprises, in yet another form thereof, a polymeric pallet that includes a material including polyethylene and a fire retardant additive wherein the fire retardant additive includes a brominated fire retardant, a hydrated mineral and antimony trioxide.

The brominated fire retardant may be a non-blooming brominated fire retardant such as poly pentabromobenzyl acrylate and/or ethylenebistetrabromophthalamide.

The hydrated mineral advantageously enhances both the vapor phase fire retardant properties and the condensed phase fire retardant properties of the final product. In some embodiments, the hydrated mineral is magnesium hydroxide.

The invention comprises, in still another form thereof, a polymeric pallet that includes a material including polyethylene and a fire retardant additive wherein the fire retardant additive includes a brominated fire retardant, melamine pyrophosphate and antimony trioxide.

In some embodiments, the fire retardant additive further includes a polyhydric compound which may be bis-pentaerythritol phosphate alcohol, trishydroxyethylisocyanurate, dipentaerythritol and/or pentaerythritol.

BRIEF DESCRIPTION OF THE DRAWINGS

The above mentioned and other features of this invention, and the manner of attaining them, will become more apparent and the invention itself will be better understood by reference to the following description of embodiments of the invention taken in conjunction with the accompanying drawings, wherein:

FIG. 1 is a perspective view of a plastic pallet.

Although the exemplification set out herein illustrates embodiments of the invention, the embodiments disclosed below are not intended to be exhaustive or to be construed as limiting the scope of the invention to the precise forms disclosed.

DETAILED DESCRIPTION OF THE INVENTION

In some embodiments, the present invention includes the use of a brominated fire retardant. Brominated fire retardants function by releasing bromine at a certain time/temperature combination (i.e., after an elevated temperature has been experienced for a given period of time), and the bromine reacts with a synergist like antimony trioxide to form a heavy vapor that reacts with free radicals in the polymer generated by degradation of the polymer from the heat of the flame or burning. This retards or delays the burning process and if used at the right level, can arrest or stop the burning process. This mechanism is known as a vapor phase flame retardant mechanism because the action is at the surface of the burning part and occurs at the solid/gaseous (vapor) interphase.

Another type of fire retardant mechanism is a condensed phase FR mechanism. Condensed phase FR performance relies on the formation of a char or insulated barrier on the surface of the part along with release of an inert (inflammable) smaller molecule. The most common of such inflammable molecules are water ($H_2O$), carbon dioxide ($CO_2$), nitrogen ($N_2$), melamine, and ammonia ($NH_4$). With a brominated FR there is a very slight amount of char formed by the antimony trioxide residue. Only a minimal amount of antimony is left in the condensed phase during burning, however, because the antimony trioxide is present only at a low initial level and because antimony trioxide partially vaporizes at flame temperatures. The vaporized antimony trioxide forms an antimony oxide analog which then reacts with the bromine to form a heavy antimony oxide-halogen complex. Thus, only a small quantity of antimony remains in the condensed phase during burning. Consequently, a bromine FR primarily functions through a vapor phase FR mechanism but does exhibit a small amount of condensed phase FR functionality.

A first embodiment of the present invention involves a FR masterbatch having three ingredients with the first ingredient being poly pentabromobenzyl acrylate (hereinafter "PBB-PA"). PBB-PA has the following chemical formula:

$$(C_{10}H_5Br_5O_2)n$$

PBB-PA is commercially available from ICL Industrial Products of Beer Sheva, Israel under the tradename FR-1025 (CAS number: 59447-57-3). The second ingredient is antimony trioxide, i.e., $Sb_2O_3$. Antimony trioxide is commercially available and can be obtained from Great Lakes Chemical Corporation under the tradename TMS®/Timonox Red Star (CAS number: 1309-64-4). The third ingredient is magnesium hydroxide, i.e., $Mg(OH)_2$. Magnesium hydroxide is commercially available and can be obtained from J. M. Huber Corporation under the tradename VERTEX® 60HST.

Different blend ratios of the three ingredients of the first FR masterbatch were prepared and tested. In one test sample, the blend ratio was approx. 37% PBB-PA, 27% magnesium hydroxide and 12% antimony trioxide (percentage by weight) with the balance being a polyethylene carrier resin. Various polyethylene carrier resins may be used including linear low density polyethylene ("LLDPE"), ethylene methyl acrylate ("EMA") copolymer, HDPE or combinations thereof.

This first FR masterbatch (37/27/12) was mixed with the polyethylene used to form the pallets at 16.5% by weight. This blend comfortably passed the UL 2335 test. It is thought that the amount of 37/27/12 FR masterbatch can be reduced to 14% or 12% by weight when mixed with the polyethylene forming the plastic pallets and still pass the UL 2335 test.

Another FR masterblend that was tested was composed of 27% PBB-PA, 36% magnesium hydroxide and 9% antimony trioxide (percentage by weight) with the balance being a polyethylene carrier resin. This 27/36/9 FR masterblend was added at 16.5% by weight to the polyethylene material used to manufacture plastic pallets. While the 27/36/9 FR masterblend passed the UL 2335 test, the 37/27/12 FR masterblend formula performed better.

Neither of the masterblends containing PBB-PA displayed any migration or blooming of the FR additive and both are expected to have good UV stability. The polymeric nature of PBB-PA in these two FR masterblends is thought to be the reason for the lack of migration. This aspect of the PBB-PA FR masterblends is also thought to make these blends a relatively environmentally friendly FR with greatly reduced tendency to bioaccumulate or persist in the environment.

The PBB-PA ingredient of these two PBB-PA FR masterblends is a brominated FR additive which carries the functional bromine which is primarily responsible for the vapor phase FR mechanism of these two PBB-PA FR masterblends. The bromine reacts in the vapor phase with antimony to form a heavy antimony oxide-halogen complex that reacts with the free radicals formed by the degradation of the polyethylene during burning or decomposition of the polyethylene, thereby delaying the burning process and even halting it.

The magnesium hydroxide decomposes at burn temperatures giving off water as a by-product. The water produced thereby acts in the vapor phase to quench flames and displace oxygen, thus contributing to the fire retardant properties of the blend. The magnesium hydroxide also forms a char of magnesium oxide in the condensed phase to help form an insulative barrier layer and inhibit the tendency of the polymer to continue burning. The interaction between the brominated FR and the magnesium hydroxide helps reduce the overall level of bromine required for FR efficacy and also tends to give a lower heat release rate (due to the water given off during decomposition). Magnesium hydroxide has the added benefit of being readily available and relatively inexpensive. In addition, it is environmentally friendly and very safe for use. In its pure form, magnesium hydroxide is safe for ingestion and used in pharmaceutical and food applications. As a suspension in water, magnesium hydroxide is often referred to as milk of magnesia because of its milk-like appearance.

One of the more significant drawbacks to the PBB-PA FR masterblends is that PBB-PA is not commercially available in large quantities at the current time. Thus, commercial production of a PBB-PA FR masterblend presents problems of supply.

A second embodiment of the present invention involves a FR masterbatch having at least three ingredients with the first ingredient being ethylenebistetrabromophthalamide which is commercially available from Albemarle Corporation under the tradename Saytex® BT-93® (CAS number: 32588-76-4). The two remaining ingredients are the same as the FR masterbatches described above, i.e., magnesium hydroxide and antimony trioxide.

Test samples of the second FR masterbatch were produced in the following ratios: 37% ethylenebistetrabromophthalamide, 27% magnesium hydroxide and 12% antimony trioxide (percentage by weight) with the balance being a polyethylene carrier resin. This formulation has been tested multiple times and with different variations of HDPE/HMWPE. The second 37/27/12 FR masterbatch was mixed at a 16.5% by weight ratio with 0.95 density polyethylene ("PE") and a 0.962 density PE when conducting these tests. When mixed at 16.5%, the second 37/27/12 FR masterbatch performs satisfactorily with regard to the UL2335 test but when mixed with 0.95 density PE its satisfactory performance is sporadic. It is thought that lowering the mix ratio from 16.5% to 14% may improve the performance of this second 37/27/12 FR masterbatch.

In these tests, the ethylenebistetrabromophthalamide did not exhibit any migration or blooming, or plate-out in processing equipment. While ethylenebistetrabromophthalamide is not polymeric, it is very compatible in the host polymer and does not migrate. It also has very low water and oil solubility. These factors all suggest that ethylenebistetrabromophthalamide will have a low tendency to bioaccumulate or persist in the environment. In addition, this FR additive is very UV stable. It is also commercially available in larger quantities than PBB-PA. The magnesium hydroxide and antimony trioxide function and react with the brominated FR in the same manner as described above with respect to PBB-PA.

Various further modifications can also be made to the masterbatch blend in accordance with the present invention. Advantageously, such alternative FR masterbatch blends will include three basic ingredients: (1) a brominated FR; (2) a hydrated mineral; and (3) antimony trioxide.

With regard to the brominated FR, it is preferably non-blooming. Both PBB-PA and ethylenebistetrabromophthalamide can advantageously be used with the present invention and are examples of a non-blooming brominated FR. PBB-PA and ethylenebistetrabromophthalamide can also be blended together to provide the brominated FR. Other brominated fire retardants compatible with polyethylene can also be used. Advantageously, such brominated FR additives are polymeric or oligomeric brominated FR additives which are likely to be non-blooming. The brominated FR ingredient is advantageously present in the FR masterbatch within the range of about 25% to about 45% by weight.

With regard to the hydrated mineral, magnesium hydroxide performed well in the test batches. It is thought that melamine/phosphorus combinations may also provide acceptable results. The hydrated mineral ingredient is advantageously present in the FR masterbatch within a range of about 20% to about 50% by weight. In this regard, it is noted that magnesium hydroxide acts independently as a fire retardant when present at sufficiently high levels, typically at approximately 30% by weight and above. For example, a master batch of polyethylene and magnesium hydroxide could be used in the manufacture of a polymeric pallet wherein magnesium hydroxide is the sole fire retardant ingredient in the master batch. Such a master batch could then be used in the manufacture of a portion of a polymeric pallet, e.g., the upper deck of the pallet, or the entire pallet such that magnesium hydroxide is the sole fire retardant ingredient in the entire polymeric pallet or that portion of the pallet manufactured using the master batch having only magnesium hydroxide as a fire retardant additive.

With regard to the third ingredient, antimony trioxide is advantageously present in the FR masterbatch within a range of about 6% to about 15% by weight.

The FR masterbatch blend may also include a carrier resin such as LLDPE, EMA copolymer, HDPE or mixtures thereof. Such carrier resins are advantageously present in the FR masterbatch within a range of about 15% to about 25% by weight.

The FR masterbatch may also include conventional antioxidants and/or process aids at levels within the range of about 0.2% to about 1.0% by weight.

The FR masterbatches are mixed using a plastics compounding process that employs conventional mixing devices known in the art to melt and mix the ingredients of the FR masterbatches.

The polymers and additives are advantageously preblended with premixing devices prior to melt compounding. Common premixing devices include ribbon blenders, for low shear applications, and Henschel blenders, for high speed, high shear applications.

Various primary mixers can be used for the production of the masterbatch, however, the primary mixer used in the process can advantageously be either a continuous mixer or a twin screw extruder. Typically, continuous mixers include two rotors that rotate in opposite directions, commonly referred to as counter-rotating directions. The materials are mixed between the two rotors and, to a lesser extent, between the rotors and the barrel of the mixer. Twin screw extruders have two screws which can have various types of mixing and metering elements disposed thereon. Typically, the screws rotate in the same direction ("co-rotating") and the mixing action takes place within the screw elements; between the barrel of the extruder and the individual screws; and, to a lesser extent, between the two screws.

Once the blend is melted and homogeneously mixed (compounded) by the primary mixer it is then discharged to a pelletizing extruder or directly to a die. The compounding temperature will vary based upon the materials and mixing device involved, however, the compounding temperature will typically fall within the range of about 180° C. to about 300° C. When discharged through a die, the molten mass mixture is discharged in separate small streams that form strands. The spaghetti-like strands are cut into barrel shaped pellets with a strand pelletizer and dewatered with an air knife. Alternatively, the strands discharged from the die can be immersed in a stream of water with the strands being cut while still in a molten state by a rotating blade. The cut strands thereby form beads/pellets as the as the water cools and solidifies the pellets. A spin dryer is then used to dewater the pellets. After dewatering, the pellets are classified and packaged.

When producing a masterbatch it is generally desirable to make the masterbatch as highly loaded with active ingredients as possible while still having a commercially viable process and production rate. This can be affected by the particle size and density of each additive, as well as whether the additives melt or not, and can also be a function of the host resin into which the additives are compounded or masterbatched. Lower density, higher melt flow (low viscosity or lower molecular weight) polymers in general help to achieve higher active ingredient loadings. Another consideration for the FR masterbatch is compatibility with the resin into which the masterbatch will be blended or "letdown." As discussed above, the FR masterbatch will typically be letdown into HDPE. For letdown into HDPE, linear low density polyethylene, ethylene methylacrylate copolymer, HDPE or mixtures thereof can advantageously be employed as the carrier resin for the masterbatch.

One advantage of using solely LLDPE as the carrier resin is that it is available in powder form which facilitates more homogeneous preblending. Magnesium hydroxide and antimony trioxide are both available in powder form. Similarly, PBB-PA and ethylenebistetrabromophthalamide are also available in powder form.

After producing the masterbatch, e.g., forming masterbatch pellets, the masterbatch is letdown into HDPE or other resin to thereby form the material used to manufacture a product, e.g., a plastic pallet. When combining the masterbatch with a resin, the masterbatch will typically be about 8% to about 50% (by weight) of the combined materials. A number of different factors can influence the masterbatch percentage when letting down the masterbatch in the resin. These factors include the specific resin that the masterbatch is letdown into; the thickness of the part that will ultimately be manufactured using the combined masterbatch and resin; the specific regulatory tests that the resulting product must satisfy; and the process employed in manufacturing the resulting product.

The pallet making process remains substantially unchanged when using a FR masterbatch in accordance with the present invention with the molding and thermoforming processes remaining largely unchanged in comparison to prior plastic pallets. The sheet extrusion process may, however, involve some additional blending and mixing. The resulting pallets will look and function the same as conventional plastic pallets. The physical properties of the pallet will also be largely unchanged, although the FR masterbatch may change the density and have a slight impact on other physical properties of the HDPE.

In alternative embodiments, the FR masterbatch may use melamine pyrophosphate (CAS No. 15541-60-3) ("MPY") or blends of MPY and polyhydric compounds such as bis-pentaerythritol phosphate alcohol (CAS No. 5301-78-0) ("bis-PEPA"); trishydroxyethyl isocyanate (CAS No. 839-90-7) ("THEIC"); dipentaerythritol (CAS No. 126-58-9); or pentaerythritol (CAS No. 115-77-5) as a substitute for the hydrated mineral (e.g., magnesium hydroxide) in the fire retardant compositions described above. For example, MPY or a blend of MPY and a polyhydric compound (e.g., bis-PEPA) could be used with a brominated fire retardant (e.g., a non-blooming brominated fire retardant such as poly pentabromobenzyl acrylate and/or ethylenebistetrabromophthalamide), antimony trioxide and a carrier resin to produce the masterbatch.

When using a blend of MPY and a polyhydric compound, the weight ratio between MPY and the polyhydric compound (e.g., bis-PEPA) may advantageously be an approximately 1.5:1 to 3:1 ratio.

Substituting MPY or a MPY/polyhydric compound blend for the hydrated mineral in the fire retardant compositions described above that also include a brominated fire retardant and antimony trioxide is believed to provide improved char formation and may thereby allow for reducing the levels of the other fire retardant additives. The use of MPY or MPY/polyhydric compound blend may also improve the physical properties of the plastic pallets. More specifically, substituting MPY or a MPY/polyhydric compound blend for magnesium hydroxide may reduce the density of the final blend and may also improve impact performance of the resulting product.

If an MPY or MPY/polyhydric compound blend is used as a substitute for magnesium hydroxide in a masterbatch including a brominated fire retardant, magnesium hydroxide and antimony trioxide as described above, the MPY or MPY/polyhydric compound blend can advantageously be added in an amount that is approximately 70% (by weight) of the magnesium hydroxide it is replacing.

In still other embodiments, the brominated fire retardant and antimony trioxide can also be eliminated and MPY or a MPY/polyhydric compound blend can be used as the sole fire retardant with HDPE or high molecular weight high density polyethylene (density>0.95 g/cm3) to form a polymeric pallet. When using a masterbatch having MPY or MPY/polyhydric compound blend as the sole fire retardant and a resin carrier, the masterbatch may advantageously be approximately 60% (by weight) MPY or MPY/polyhydric compound blend and approximately 40% (by weight) resin carrier. For example, such a masterbatch could utilize an MPY/bis-PEPA blend wherein the MPY and bis-PEPA have a 1.5:1 to 3:1 weight ratio. The resin carrier can be a PE with the MPY/bis-PEPA blend being approximately 60% (by weight) of the masterbatch with the PE carrier being approximately 40% (by weight). The masterbatch can then be mixed with a HDPE/HMWPE and used to form a plastic pallet as described above with reference to alternative masterbatch formulations. One advantage of using MPY or a MPY/polyhydric compound blend is that it provides a non-halogenated fire retardant for use with a plastic pallet.

For example, a master batch of polyethylene and MPY could be used in the manufacture of a polymeric pallet wherein MPY is the sole fire retardant ingredient in the master batch. Such a master batch could then be used in the manufacture of a portion of a polymeric pallet, e.g., the upper deck of the pallet, or the entire pallet such that MPY is the sole fire retardant ingredient in the entire polymeric pallet or that portion of the pallet manufactured using the master batch having only MPY as a fire retardant additive.

Although the embodiments described above which have a fire retardant containing MPY have not yet been rigorously tested, it is anticipated that fire retardants containing MPY can be used in a manner similar to that described above to satisfy the necessary standards for plastic pallets.

Plastic pallets having a fire retardant as described herein may also incorporate additional features that can be implemented with plastic pallets. For example, it is possible to embed an RFID (radio-frequency identification) tag 22 into every pallet 20. By placing RFID tags in the pallets, the pallets can be tracked for inventory and location purposes. The use of such RFID tags may also be employed with other types of pallets.

Plastic pallets 20 having RFID tags 22 embedded therein can be used in a variety of ways including a pallet pooling system. In such a pallet pooling system, one company would own the pallets and lease them to a various other companies, e.g., consumer product companies that distribute their products on unitized pallets to retailers and distribution centers. These products are often placed in storage in private or public warehouses before shipment to retail stores for general consumption or purchase. The use of RFID tags embedded in the pallets allows the consumer product companies who are leasing the pallets to track their inventory via the RFID tags and pay for the pallets on a per use basis.

While this invention has been described as having an exemplary design, the present invention may be further modified within the spirit and scope of this disclosure. This application is therefore intended to cover any variations, uses, or adaptations of the invention using its general principles.

What is claimed is:

1. A method of manufacturing a polymeric pallet comprising:
    mixing polyethylene with a fire retardant additive to form a final mixture wherein the fire retardant additive includes a brominated fire retardant, a hydrated mineral and antimony trioxide; and
    using the final mixture to form at least a portion of the pallet.

2. The method of claim 1 wherein the brominated fire retardant is non-blooming in the manufacture of the pallet.

3. The method of claim 2 wherein the brominated fire retardant is polymeric.

4. The method of claim 2 wherein the brominated fire retardant is oligomeric.

5. The method of claim 1 wherein the brominated fire retardant is poly pentabromobenzyl acrylate.

6. The method of claim 1 wherein the brominated fire retardant is ethylenebistetrabromophthalamide.

7. The method of claim 1 wherein the hydrated mineral is magnesium hydroxide.

8. The method of claim 1 further comprising:
    mixing the fire retardant additive with a carrier resin to form a masterbatch; and
    mixing the masterbatch with the polyethylene to form the final mixture.

9. The method of claim 8 wherein the brominated fire retardant is non-blooming in the manufacture of the pallet.

10. The method of claim 9 wherein the brominated fire retardant is polymeric.

11. The method of claim 9 wherein the brominated fire retardant is oligomeric.

12. The method of claim 8 wherein the brominated fire retardant is poly pentabromobenzyl acrylate.

13. The method of claim 8 wherein the brominated fire retardant is ethylenebistetrabromophthalamide.

14. The method of claim 8 wherein the hydrated mineral is magnesium hydroxide.

15. The method of claim 8 wherein:
    the brominated fire retardant is about 25% to about 45% by weight of the additive;
    the hydrated mineral is about 20% to about 50% by weight of the additive;
    the antimony trioxide is about 6% to about 15% by weight of the additive; and
    the carrier resin is about 15% to about 25% by weight of the additive.

16. The method of claim 15 wherein the masterbatch is at least about 12% by weight of the masterbatch and polyethylene mixture.

17. The method of claim 15 wherein the brominated fire retardant is about 37% by weight of the additive; the hydrated mineral is magnesium hydroxide and is about 27% by weight of the additive; and the antimony trioxide is about 12% by weight of the additive.

18. The method of claim 17 wherein the brominated fire retardant is poly pentabromobenzyl acrylate.

19. The method of claim 17 wherein the brominated fire retardant is ethylenebistetrabromophthalamide.

20. The method of claim 17 wherein the brominated fire retardant is a mixture of poly pentabromobenzyl acrylate and ethylenebistetrabromophthalamide.

21. The method of claim 17 wherein the masterbatch is approximately 16.5% by weight of the masterbatch and polyethylene mixture.

22. A method of manufacturing a polymeric pallet comprising:
    mixing polyethylene with a fire retardant additive to form a final mixture wherein the fire retardant additive includes a brominated fire retardant, melamine pyrophosphate and antimony trioxide; and
    using the final mixture to form at least a portion of the pallet.

23. The method of claim 22 wherein the fire retardant additive further includes a polyhydric compound.

24. The method of claim 23 wherein the polyhydric compound is selected from the group consisting of bis-pentaerythritol phosphate alcohol, trishydroxyethylisocyanurate, dipentaerythritol and pentaerythritol.

25. The method of claim 23 wherein the polyhydric compound is bis-pentaerythritol phosphate alcohol.

26. The method of claim 22 further comprising:
    mixing the fire retardant additive with a carrier resin to form a masterbatch; and
    mixing the masterbatch with the polyethylene to form the final mixture.

27. The method of claim 26 wherein the fire retardant additive further includes a polyhydric compound.

28. The method of claim 27 wherein the polyhydric compound is selected from the group consisting of bis-pentaerythritol phosphate alcohol, trishydroxyethylisocyanurate, dipentaerythritol and pentaerythritol.

29. The method of claim 27 wherein the polyhydric compound is bis-pentaerythritol phosphate alcohol.

30. A polymeric pallet comprising:
    a material comprising polyethylene and a fire retardant additive wherein the fire retardant additive includes a brominated fire retardant, a hydrated mineral and antimony trioxide.

31. The polymeric pallet of claim 30 wherein the brominated fire retardant is non-blooming.

32. The polymeric pallet of claim 31 wherein the brominated fire retardant is polymeric.

33. The polymeric pallet of claim 31 wherein the brominated fire retardant is oligomeric.

34. The polymeric pallet of claim 30 wherein the brominated fire retardant is poly pentabromobenzyl acrylate.

35. The polymeric pallet of claim 30 wherein the brominated fire retardant is ethylenebistetrabromophthalamide.

36. The polymeric pallet of claim 30 wherein the hydrated mineral is magnesium hydroxide.

37. A polymeric pallet comprising:
a material comprising polyethylene and a fire retardant additive wherein the fire retardant additive includes a brominated fire retardant, melamine pyrophosphate and antimony trioxide.

38. The polymeric pallet of claim 37 wherein the fire retardant additive further includes a polyhydric compound.

39. The polymeric pallet of claim 38 wherein the polyhydric compound is selected from the group consisting of bis-pentaerythritol phosphate alcohol, trishydroxyethylisocyanurate, dipentaerythritol and pentaerythritol.

40. The polymeric pallet of claim 38 wherein the polyhydric compound is bis-pentaerythritol phosphate alcohol.

\* \* \* \* \*